US008510414B2

(12) United States Patent
Marce et al.

(10) Patent No.: US 8,510,414 B2
(45) Date of Patent: Aug. 13, 2013

(54) TELECOMMUNICATION EQUIPMENT UNIT ENABLING CALL CONTROL MIGRATION

(75) Inventors: Olivier Marce, Massy (FR); Laurent Philippe Anquetil, Paris (FR)

(73) Assignee: Alcatel Lucent, Paris (FR)

( * ) Notice: Subject to any disclaimer, the term of this patent is extended or adjusted under 35 U.S.C. 154(b) by 1713 days.

(21) Appl. No.: 09/969,579

(22) Filed: Oct. 4, 2001

(65) Prior Publication Data

US 2002/0055354 A1  May 9, 2002

(30) Foreign Application Priority Data

Oct. 5, 2000  (FR) ..................................... 00 12724

(51) Int. Cl.
*G06F 15/16* (2006.01)
(52) U.S. Cl.
USPC .......................................... 709/219; 709/218
(58) Field of Classification Search
USPC ................. 709/218–219; 370/230, 235, 352, 370/356, 359, 360, 389, 396, 410, 395
See application file for complete search history.

(56) References Cited

U.S. PATENT DOCUMENTS

| 5,526,358 | A | * | 6/1996 | Gregerson et al. | ............ 709/221 |
| 5,612,957 | A | * | 3/1997 | Gregerson et al. | ............ 370/401 |
| 5,699,351 | A | * | 12/1997 | Gregerson et al. | ............ 370/256 |
| 5,778,185 | A | * | 7/1998 | Gregerson et al. | ............ 709/226 |
| 5,793,968 | A | * | 8/1998 | Gregerson et al. | ............ 709/209 |
| 6,563,835 | B1 | * | 5/2003 | Chen | ............................. 370/410 |
| 6,714,987 | B1 | * | 3/2004 | Amin et al. | .................... 709/249 |
| 2002/0073207 | A1 | * | 6/2002 | Widger et al. | ................ 709/227 |
| 2003/0161296 | A1 | * | 8/2003 | Butler et al. | .................... 370/352 |

FOREIGN PATENT DOCUMENTS

JP  10243095 A  *  9/1998

OTHER PUBLICATIONS

"Newton's Telecom Dictionary", by Harry Newton, 20th Edition, CMP Books, pp. 559, 747.*
Toga J et al., "ITU-T Standardization Activities for Interactive Multimedia Communications on Packet-based Networks: H.323 and Related Recommendations", Computer Networks and ISDN Systems, North Holland Publishing. Amsterdam, NL, vol. 31, No. 3, pp. 205-223, Feb. 11, 1999.

* cited by examiner

*Primary Examiner* — Minh-Chau Nguyen
(74) *Attorney, Agent, or Firm* — Sughrue Mion, PLLC

(57) ABSTRACT

A method of managing a call managed at any given time by a call controller, which method includes steps of:

choosing an initial call controller managing said call, measuring the satisfaction of criteria during the call, deciding as a function of said measurement to change the call controller managing said call, and in the event of a decision to change, transmitting information relating to the call to the chosen call controller.

24 Claims, 1 Drawing Sheet

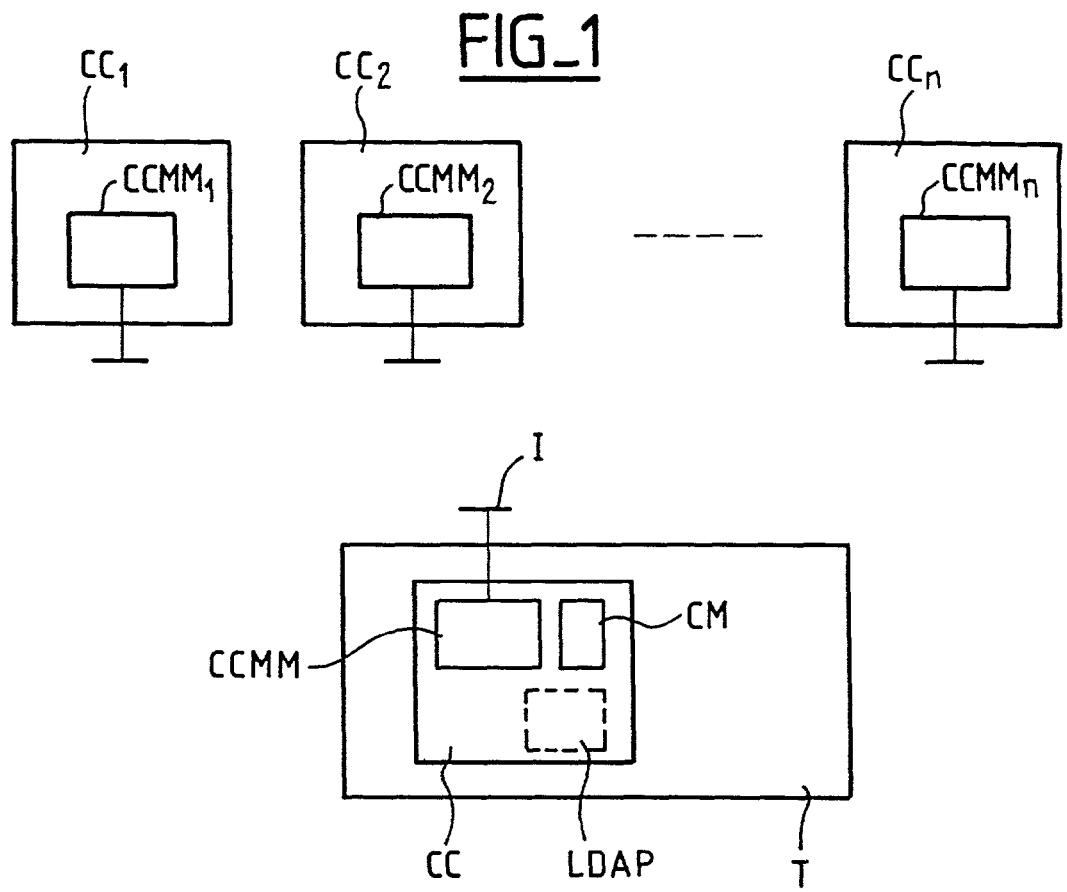

TELECOMMUNICATION EQUIPMENT UNIT ENABLING CALL CONTROL MIGRATION

The present invention relates to managing calls between telecommunication equipment units. It applies particularly well to Voice over IP (Internet Protocol) (VoIP) telephony.

BACKGROUND OF THE INVENTION

A call controller is a device whose function is to react to notifications or alarms from equipment units involved in the call or to requests transmitted by a signaling network.

The call controller is also responsible for reserving the resources needed for a call when a call set-up request is received, for example. Similarly, the call controller is responsible for clearing down its resources on termination of the call.

In conventional telephony the call controller is a centralized device, regardless of the technology used to transmit data relating to the call, the capacity of the telecommunication network concerned, the type of signaling protocol, etc.

Even in an intelligent network (IN) system, in which functions can be distributed over a plurality of physical platforms, calls are nevertheless managed by a single call controller.

Although Internet technologies are by their nature distributed, Internet (VoIP) telephony solutions are not all independent of this centralized call management concept. In the H.323 series of recommendations of the ITU-T (International Telecommunication Union), call management is handled by one of the two terminals (or by one of their representatives) in a predetermined manner.

The centralized solution is not satisfactory because the rapid increase in the number of terminals connected to a network calls for continuous upgrading of the performance of the centralized call controller. The call controller therefore soon becomes extremely costly.

Solutions for decentralizing call management have been proposed. One solution is described in the following article, for example: "*ITU-T standardization activities for interactive multimedia communications on packet-based networks: H323 and related recommendations*", James Torga and Jörg Ott, *Computer Networks*, No. 31.

In the above solution, the call controller is chosen during the call set-up phase. It can be one of the terminals that are parties to the call, for example.

However, the above solution does not really solve the problem since, to the contrary, it requires the terminals to have sufficient resources to be able to manage a call, even if that call evolves from a simple call between two parties to a multi-party conference call.

Work has nevertheless been done on distributed call management.

Solutions considered include the Session Initiation Protocol (SIP) defined in Request For Comments (RFC) No. 2543 of the Internet Engineering Task Force (IETF).

In that solution, the call is not controlled by a single call controller, but by a plurality of "intelligent" terminals (i.e. terminals able to execute the functions of a call controller), each terminal executing some of the functions needed to manage a call.

According to the above solution, all the equipment units participating in the call (terminals, terminal representatives, redirection systems, etc.) contribute to call control. Each system has a particular call control function. The combination of those functions constitutes call control.

The advantages of the above solution are obviously the distribution of the load between the various equipment units involved and the simplicity of developing and maintaining applications, which have to provide a restricted number of functions.

On the other hand, it is clear that the benefit of this distribution has to be offset against the difficulty of obtaining an overview of the call, because control is distributed between the various equipment units, especially when the equipment units involved in call control belong to different operators.

OBJECTS AND SUMMARY OF THE INVENTION

The present invention aims to solve the problems associated with centralizing call control in the conventional way, or in accordance with the H.323 series recommendations, as well as those due to distribution of control between multiple equipment units.

To this end, the invention provides a telecommunication equipment unit able to communicate with one or more other telecommunication equipment units connected by a telecommunication network. At least some of said telecommunication equipment units include call controllers able to manage the call. In the equipment unit, the call controller of said telecommunication equipment unit includes a mobility manager for negotiating with the other call controllers and deciding, in consultation with said other call controllers, which of said call controllers should manage said call at a given time.

The invention also provides a method of managing a call managed at any given time by a call controller. The method including steps of:
  choosing an initial call controller managing said call,
  measuring the satisfaction of criteria during the call,
  deciding as a function of said measurement to change the call controller managing said call, and
  in the event of a decision to change, transmitting information relating to the call to the chosen call controller.

According to the invention, at any given time, call control is localized to only one equipment unit used in the call, but can be shifted during the call to one or the other of the equipment units.

By shifting it to the equipment unit best able to provide the requested services at a given time, this temporal mobility of the call control function optimizes the use of resources during a call and preserves an overview of call control, which is localized at a single equipment unit.

BRIEF DESCRIPTION OF THE DRAWING

The invention and its advantages will become more clearly apparent from the following description of one embodiment of the invention, which is given with reference to the accompanying drawing.

FIG. 1 shows the use of a telecommunication equipment unit according to the invention.

MORE DETAILED DESCRIPTION

In the embodiment shown in FIG. 1, the telecommunication equipment unit is a terminal.

The communication terminal T includes a call controller CC. The call controller includes control means CM. The control means CM are conventional in themselves and use existing protocols such as the SIP or the protocols described in Recommendation H.323 of the ITU-T (International Telecommunication Union), entitled "Packet-based multimedia communications systems".

The call controller CC further includes a call control mobility manager (CCMM).

The mobility manager CCMM is able to negotiate with the other call controllers $CC_1, CC_2, \ldots, CC_n$ and to decide, in consultation with them, which of them should manage said call at a given time.

The choice may be made in accordance with a plurality of criteria, including, for example:

The number and/or the quality of the functions provided by the control means of each of the call controllers CC, $CC_1, CC_2, \ldots, CC_n$ involved. Some control means may not be able to manage "videoconference" calls, for example.

The load on the processing resources (in particular, the onboard microprocessor in the terminals) supporting the call controllers CC, $CC_1, CC_2, \ldots, CC_n$.

Access to external resources. For example, if it is necessary to refer to a database, it may be beneficial to choose the call controller able to access the database most easily.

Obviously the above list of criteria is not limiting on the invention, and the mobility manager CCMM can take into account as many criteria as necessary.

In one embodiment of the present invention, the call is initially under the control of a call controller chosen arbitrarily. The call controller initially chosen can be that of the calling terminal, although this option is not limiting on how the choice is made.

In one embodiment of the invention, the mobility managers can communicate with each other in various ways, for example two-by-two or on a "broadcast" or "multicast" basis. Similarly, communication between mobility managers can be initiated in different ways. For example, communication can be initiated at the request of the mobility manager of the call controller which currently has control, as a function of various criteria. Those criteria can be exceeding a threshold or a given time interval, for example.

Negotiation, i.e. the exchange of information between the various mobility managers with the object of determining which call controller takes charge of managing the call, can be effected in any manner evident to the skilled person, without this choice limiting the scope of the present invention.

The information coding and transport options include, for example, using remote procedure calls (RPC) or remote method invocation (RMI). Another option is to use a software bus conforming to the CORBA standard as specified by the Open Management Group (OMG), or to transport information on a "socket" communication channel.

In the embodiment shown in FIG. 1, the mobility manager includes a mobility interface I enabling it to negotiate with the other call controllers. The mobility interface I can conform to the Common Object Request Broker Architecture (CORBA) mentioned above, for example.

The information exchanged during negotiation can be coded in accordance with the extended Mark-up Language (XML) standard, for example.

Similarly, the final decision can be taken by one or more CCMM, and in accordance with any policy.

In one embodiment of the invention, the list of call controllers participating in the call can be fixed in a static manner or updated dynamically as a function of the available call controllers. Updating can be effected by writing a newly available call controller or by a third party authority. The list can be stored by the call controllers, in a replicated or shared manner, or by a system external to the call controllers.

The first choice of a call controller responsible for managing a call can be made when the call is set up.

As previously mentioned, this choice can also be reviewed and modified during the call, as a function of criteria that can be the same as or different from those used to make the choice during call set-up. To this end, the mobility manager is responsible for measuring satisfaction of criteria during the call.

For example, the load on the processing resource supporting a call controller can evolve as a function of the number of calls in which it is involved. It may also be beneficial to shift the management of a call from a call controller that is temporarily overloaded to a call controller that is more available.

Similarly, the nature of a call may evolve; for example, a call between two parties may evolve into a call between three or more parties (conference call), or even a call that involves exchanging video data (videoconference call). This evolution may make it necessary to change the call controller in charge of managing the call.

Another example is invoking external information. A call previously set up may suddenly necessitate the use of data stored in a database, for example. In this case, it may be beneficial to change the call controller responsible for managing the call so that the nearest one manages it. This saves time in executing requests, is more secure, and entails less congestion of the network.

To this end, the mobility manager CCMM therefore includes means for transmitting information relating to the call to be transferred to another mobility manager. Transmission can be two-way, depending on whether the mobility manager is taking control of a new call that was previously being managed by another call controller $CC_1, CC_2, \ldots, CC_n$ or, to the contrary, is transferring a call for which it was previously responsible to one of the other call controllers.

This information can be transmitted between the mobility managers in a similar way to that used during negotiation, via the same mobility interface or a different interface.

The following example describes the mechanism that executes when a migration criterion is satisfied, in one particular embodiment of the invention. The mobility manager CCMM of the call controller CC responsible for controlling the call enters into communication with the other controllers $CC_1$ to $CC_n$, which have respective mobility managers $CCMM_1$ to $CCMM_n$, when a ceiling for use of the resources of the equipment unit on which it is executing is reached. To this end, it obtains first of all a list of the communication controllers that can be used in the current call, and enters into communication with each of them. It advises them of the status of the call, its parameters, and the status of its own resources. The mobility managers of the call controllers then negotiate which one should take control. When the mobility manager CCMM has found a mobility manager agreeing to take control of the call, for example the mobility manager $CCMM_2$, it transfers all the information that it has on the call to the mobility manager $CCMM_2$, and if required, depending on the data transfer technique used, informs the equipment units participating in the call of that transfer.

In one particular embodiment of the invention, the mobility manager CCMM includes means for communicating with a resource manager. Those means can be a base using the LDAP protocol to make data available, or any other equivalent mechanism. The scope of the present invention is not limited by the request mechanism or the data transfer mechanism or the type of database provided.

The invention claimed is:

1. A first telecommunication device that communicates with one or more other telecommunication devices connected by a telecommunication network, said first telecommunication device and at least some of said other telecommunication devices having call controllers that manage a call, wherein the call controller of said first telecommunication device comprises a mobility manager for negotiating with other call controllers, wherein negotiating with the other call controllers comprises, when said first telecommunication device is managing a call, said mobility manager of said first telecommunication device exchanging information relating to said call with a mobility manager of at least one of said other telecommunication devices in response to a determination that said first telecommunication device may not be suitable for managing said call, and deciding, in consideration of said negotiating, whether said call controller of said first telecommunication device or the call controller of said at least one other telecommunication device should manage said call at a given time, wherein said negotiating occurs at a time when said first telecommunication device might still be suitable for managing said call at said given time.

2. The first telecommunication device according to claim 1, wherein said mobility manager of said first telecommunication device has means of access to a list of call controllers usable for said call.

3. The first telecommunication device according to claim 2, wherein said mobility manager of said first telecommunication device comprises means for entering itself on said list.

4. The first telecommunication device according to claim 1, wherein said mobility manager of said first telecommunication device accesses a list of call controllers usable for said call.

5. The first telecommunication device according to claim 4, wherein said mobility manager of said first telecommunication device enters itself on said list.

6. The first telecommunication device according to claim 1, wherein said mobility manager comprises a mobility interface for negotiating with said other call controllers.

7. The first telecommunication device according to claim 1, wherein said mobility manager comprises means for informing some of said devices of the change of call controller managing said call.

8. The first telecommunication device according to claim 1, wherein the information relating to said call is represented in accordance with the XML standard.

9. The first telecommunication device according to claim 1, wherein said mobility manager of said first telecommunication device comprises means for communicating with a resource manager.

10. The first telecommunication device of claim 1, wherein the mobility manager of said first telecommunication device negotiates with other call controllers after the call is set up between a calling party and a called party.

11. The first telecommunication device according to claim 1, wherein said mobility manager of said first telecommunication device informs some of said devices of the change of call controller managing said call.

12. The first telecommunication device according to claim 1, wherein said mobility manager of said first telecommunication device communicates with a resource manager.

13. The first telecommunication device according to claim 1, wherein said determination that said first telecommunication device may not be suitable for managing said call comprises a determination that said first telecommunication device has exceeded a threshold of a predetermined criterion.

14. The first telecommunication device according to claim 1, wherein said determination that said first telecommunication device may not be suitable for managing said call comprises a determination that said first telecommunication device has not met a threshold of a predetermined criterion.

15. A method of managing a call, said call being managed at any given time by a call controller, the method comprises:
choosing an initial call controller managing said call;
measuring a satisfaction of criteria during management of said call by said initial call controller;
in response to said measurement of satisfaction of said criteria by said initial call controller, initiating a negotiation amongst call controllers to determine which call controller should be chosen to manage said call; and
in an event of a decision to change, transmitting information relating to the call to the chosen call controller,
wherein said negotiating occurs at a time when said initial call controller might still be suitable for managing said call at said given time.

16. The method according to claim 15, wherein the method further comprises informing another call controller of the change of call controller managing said call.

17. The method according to claim 15, wherein the method further comprises exchanging information relating to said call between the call controller managing said call and another call controller in order to change the call controller managing said call.

18. The method according to claim 17, wherein the information relating to said call is represented in accordance with the XML standard.

19. The method according to claim 15, wherein the method further comprises accessing a list of call controllers usable for said call.

20. The method according to claim 15, wherein the method further comprises communicating with a resource manager.

21. The method according to claim 15, wherein negotiation is initiated when said measurement determines that a predetermined threshold has been exceeded.

22. The method according to claim 15, wherein negotiation is initiated when said measurement determines that a predetermined threshold has not been met.

23. A first telecommunication device that communicates with one or more other telecommunication devices connected by a telecommunication network, said first telecommunication device and at least some of said other telecommunication devices having call controllers that manage a call, wherein the call controller of said first telecommunication device comprises a mobility manager for negotiating with the other call controllers, wherein negotiating with the other call controllers comprises, when said first telecommunication device is managing a call, said mobility manager of said first telecommunication device exchanging information relating to said call with the mobility manager of at least one of said other telecommunication devices in response to passage of a predetermined interval, and deciding, in consideration of said negotiating, whether said call controller of said first telecommunication device or the call controller of said at least one other telecommunication device should manage said call at a given time, wherein said negotiating occurs at a time when said first telecommunication device might still be suitable for managing said call at said given time.

24. A method of managing a call, said call being managed at any given time by a call controller, the method comprises:
choosing an initial call controller managing said call;
after management of said call by said initial call controller for a predetermined interval, evaluating said initial call controller and at least one other call controller in accordance with at least one criterion to determine which call controller should be chosen to manage said call; and
in an event of a decision to change, transmitting information relating to the call to the chosen call controller, wherein said evaluating occurs at a time when said initial call controller might still be suitable for managing said call at said given time.

* * * * *